Patented June 25, 1946

2,402,591

UNITED STATES PATENT OFFICE 2,402,591

CHEMICAL COMPOUNDS AND PROCESSES

Wilbur A. Lazier, Birmingham, Ala., and Paul L. Salzberg, Brandywine Hundred, Del., assignors to E. I. du Pont de Nemours & Company, Wilmington, Del., a corporation of Delaware No Drawing. Application March 28, 1945, Serial No. 585,397

8 Claims. (Cl. 260—462)

This invention relates to esters of chlorovinylboronic acid and processes for their manufacture.

An object of this invention is to provide a new and useful class of boronic esters. A further object is to prepare these new esters by novel and economical processes which give high yields of relatively pure products. A still further object is to utilize these new esters for diverse technical applications. Other objects will appear hereinafter.

These objects are accomplished in accordance with the present invention by providing esters of chlorovinylboronic acid which may be represented by the general formula

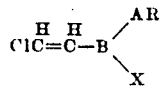

wherein A represents an oxygen or a sulfur atom, R represents any hydrocarbon or substituted hydrocarbon radical, and X represents chlorine, OH or AR.

In preparing these esters of chlorovinylboronic acid it is convenient to use such starting materials as chlorovinylboron dichloride, ClCH=CHBCl₂

chlorovinylboronic acid, ClCH=CHB(OH)₂ and chlorovinylboron oxide, (ClCH=CHBO)₃. For the preparation of chlorovinylboron dichloride from acetylene and boron trichloride, reference is made to the copending application of H. R. Arnold, Serial No. 585,394 filed on Mar. 28, 1945. For the preparation of chlorovinylboronic acid and chlorovinylboron oxide from chlorovinylboron dichloride, see another copending application of H. R. Arnold, Serial No. 585,395, filed on Mar. 28, 1945.

In the preparation of oxygen esters one may use chlorovinylboron dichloride, chlorovinylboronic acid, or chlorovinylboron oxide to esterify a hydroxyl containing organic compound, ROH, in which R stands for an organic carbon containing radical.

The reaction of chlorovinylboron dichloride with a hydroxyl containing organic compound, ROH, takes place readily at room temperature or below upon mixing the reactants. To obtain a symmetrical diester it is necessary to react two mols of a hydroxyl containing organic compound with one mol of chlorovinylboron dichloride, but to obtain a monoester it is only necessary to use equimolar quantities of these two reactants as can be seen from the following equations:

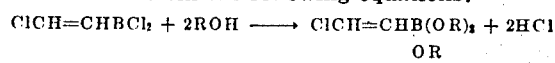

However, if the hydroxyl containing organic compound is a glycol with only a few carbon atoms separating the hydroxyl groups, the reaction of equimolar quantities of these two reactants will lead to the formation of cyclic esters as can be appreciated by reference to Examples 2 and 3 hereinbelow. Similar considerations apply to the reaction between chlorovinylboron dichloride and other polyhydric organic compounds.

The reaction of chlorovinylboronic acid with a hydroxyl containing organic compound, ROH, will take place at room temperature if the ester or water is readily separable from the reaction mixture. However, it is usually preferred to heat the reactants and fractionally distill from the reaction mixture the by-product water. To obtain a symmetrical diester it is necessary to react two mols of a hydroxyl containing organic compound with one mol of chlorovinylboronic acid, but to obtain a monoester it is only necessary to use equimolar quantities of these two reactants as can be seen from the following equations.

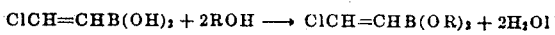

However, if the hydroxyl containing organic compound is a glycol with only a few carbon atoms separating the hydroxyl groups, the reaction of equimolar quantities of these two reactants will lead to the formation of cyclic esters as can be seen by referring to Example 3 hereinbelow. Similar considerations apply to the reaction between chlorovinylboronic acid and other polyhydric organic compounds.

Chlorovinylboron oxide, (ClCH=CHBO)₃, which is the anhydride of chlorovinylboronic acid, can be substituted for the acid in preparing the esters. It is especially useful for obtaining the monoesters when reacted in the proportions indicated in the following equation.

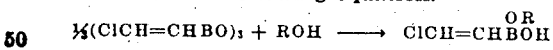

If two mols of a hydroxyl containing organic compound, ROH, are used instead of one as in the preceding equation, a diester will be produced. As in the case of chlorovinylboronic acid, reaction with a glycol will lead to the formation of a cyclic ester or a diester depending upon how many mols of the glycol enter into the reaction.

Esters of chlorovinylboronic acid with short chain alkanols, ClCH=CHB(OR')₂, may be reacted with higher boiling hydroxyl containing organic compounds to yield esters of these latter compounds.

ClCH=CHB(OR')₂ + 2ROH → ClCH=CHB(OR)₂ + 2R'OH

Such a reaction will take place at room temperature if the ester being formed or the short chain alkanol is readily separable from the reaction mixture. It is usually preferred to heat the reactants and fractionally distill from the reaction mixture the short chain alkanol which is a by-product of the reaction. If in the reaction illustrated in the above equation only one mol of a hydroxyl containing organic compound, ROH, is used, a mixed ester of the formula

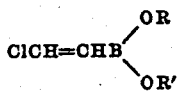

is obtained. Reaction of equimolar quantities of a glycol and a short chain dialkyl chlorovinylboronate results in the formation of a cyclic ester as shown in Example 3 below.

Thio esters of chlorovinylboronic acid may be obtained by the general methods described. The thio esters are readily prepared by reacting a mercaptan with chlorovinylboron dichloride. Short chain dialkyl chlorovinylboronates may be reacted with higher boiling mercaptans to yield thio esters of these mercaptans.

The esters of chlorovinylboronic acid are a novel class of organic compounds having valuable properties for a variety of uses. In general, they are very soluble in oxygenated organic solvents and in varying degrees also soluble in other types of organic liquids. The properties of representative members of this class are described in the following examples which illustrate but do not limit the practice of this invention. All parts are given by weight.

Example 1

The dimethyl ester of chlorovinylboronic acid, ClCH=CHB(OCH₃)₂, is obtained in over 87% yield by the slow addition of 34 parts of methanol to 75 parts of chlorovinylboron dichloride which is cooled to about −20° C. The ester is purified by distillation.

This ester is a colorless liquid boiling at 132° C. at atmospheric pressure and at 53° C. at 42 mm. pressure. It is readily soluble in oxygenated organic solvents and is hydrolyzed by water to methanol and chlorovinylboronic acid. Its density is $D_4^{25}=1.0753$ and refractive index is $N_D^{25}=1.4328$. Analytical data support the assigned structure and are as follows:

|  | Carbon | Hydrogen | Chlorine | Boron |
|---|---|---|---|---|
| Found, percent | 34.91 | 6.07 | 26.58 | 8.06 |
| Calculated for C₄H₈O₂ClB, percent | 35.76 | 6.00 | 26.39 | 8.05 |

Example 2

The tetramethylene ester of chlorovinylboronic acid is obtained as follows: 18 parts of tetramethylene glycol are added to a stirred solution of 25 parts of chlorovinylboron dichloride dissolved in 75 parts of chloroform which is cooled to about −50° C. Hydrogen chloride is evolved as the reaction mixture is allowed to warm to room temperature, and the chloroform and residual hydrogen chloride are then removed by applying a vacuum to the reaction mixture. The ester remains as a clear colorless syrup. Molecular weight determination indicates the material to be largely the cyclic monomeric ester. Its viscosity and molecular weight can be increased by heating. This product is soluble in oxygenated organic solvents and in chloroform. It is soluble in water in which it slowly hydrolyzes to chlorovinylboronic acid.

Example 3

The cyclic ethylene glycol ester of chlorovinylboronic acid is a colorless liquid boiling below 200° C. It may be prepared by heating a mixture of chlorovinylboronic acid and ethylene glycol in molar proportions at 130–160° C. until no more water is eliminated.

HOCH₂CH₂OH + ClCH=CHB(OH)₂ →

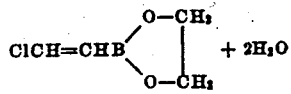 + 2H₂O

By employing a larger proportion of glycol the diester may be obtained.

2HOCH₂CH₂OH + ClCH=CHB(OH)₂ →

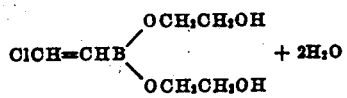 + 2H₂O

These products may also be prepared from chlorovinylboron dichloride or dimethyl chlorovinylboronate by reaction with the glycol. Glycerol esters of chlorovinylboronic acid are obtained in an analogous manner.

Example 4

A polymeric chlorovinylboronic ester is prepared as follows: A solution of 4 parts of high viscosity polyvinyl alcohol in 150 parts of water is stirred rapidly while a solution of 5 parts of chlorovinylboronic acid in 100 parts of water is added. The white granular polyvinyl ester of chlorovinylboronic acid precipitates. It is separated by filtration and washed with water. This new polymer is soluble in chloroform and dioxane, and by evaporation of these solutions it may be obtained as a clear, tough film.

The polyvinyl ester of chlorovinylboronic acid may also be obtained by adding 22 parts of powdered polyvinyl alcohol to a stirred chloroform solution of 36 parts of chlorovinylboron dichloride and after 2 to 3 hours, warming the mixture to remove dissolved hydrogen chloride. The chloroform solution of the ester may be used to apply a coating of polyvinyl chlorovinylboronate to various materials.

Example 5

Thio esters of chlorovinylboronic acid may be obtained by the general methods described. The bisdodecyl thio ester of chlorovinylboronic acid is a colorless liquid, soluble in most organic solvents but insoluble in water. It is prepared by heating a mixture of 4.04 parts of dodecanethiol-1 with 1.34 parts of dimethyl chlorovinylboronate at 100° C. until the methanol has been removed. The 1,10-decane dithio ester of chlorovinylboronic acid is a viscous amber oil. It is obtainable by the reaction of decanedithiol-1,10 with chlorovinylboron dichloride.

Example 6

Cellulose may be esterified by treating it with a chloroform solution of chlorovinylboron dichloride or a water solution of chlorovinylboronic acid. Sixteen parts of cotton linters were dried and soaked for 12 hours at 30° C. in a solution of 21 parts of chlorovinylboron dichloride in 300 parts of chloroform. Hydrogen chloride was evolved. The swollen product was filtered from the reaction mixture, washed with chloroform and dried. The modified cellulose contained both boron and chlorine.

Example 7

An ester having the structure

is prepared by mixing chlorovinylboron dichloride with an equimolar amount of octanethiol and heating the mixture to 100° C. and finally under reduced pressure to remove HCl and any unreacted starting materials. The product is a viscous oil.

While the above examples have illustrated certain esters of chlorovinylboronic acid, this invention includes all esters of this acid. Among other examples of these may be mentioned the simple alkyl chlorovinylboronates such as the ethyl, isopropyl, butyl, amyl, octyl, dodecyl and octadecyl chlorovinylboronates; cycloaliphatic esters such as the cyclohexyl and menthyl esters; aromatic esters such as phenyl and naphthyl chlorovinylboronates; unsaturated esters such as vinyl, 2-ethylbutenyl, crotyl and allyl esters; and thio esters such as methyl thio, ethyl thio, ethylenedithio, and phenyl thio chlorovinylboronates. Esters of chlorovinylboronic acid with polymeric hydroxy compounds are also a part of this invention. Additional examples of such esters are the starch, dextrin and partially hydrolyzed polyvinyl acetate and acetal esters of chlorovinylboronic acid. Among the chlorovinylboronic esters of polyhydric alcohols may be mentioned those of mannitol, sorbitol, xylitol and erythritol. The alcohol or thioalcohol part of chlorovinylboronic esters may contain other substituent groups such as halogen, amino, aldehyde, keto, nitro, carboxyl, carboxylic ester and amide groups.

Monoesters and mixed esters corresponding to the above diesters where the boron atom is attached also to Cl, OH, or another alcohol radical likewise are a part of this invention.

Esters of chlorovinylboronic acids are useful in a number of applications. For example, many of them are active fungicides. Others are useful as plasticizers, polymer modifiers and as synthetic intermediates. The polymeric esters are useful film and fiber forming materials.

As many apparently widely different embodiments of this invention may be made without departing from the spirit and scope thereof, it is to be understood that we do not limit ourselves to the specific embodiments thereof except as defined in the appended claims.

We claim:
1. An ester of chlorovinylboronic acid.
2. An aliphatic ester of chlorovinylboronic acid.
3. A process of making an aliphatic ester of chlorovinylboronic acid which comprises contacting chlorovinylboron dichloride with a substance selected from the group consisting of aliphatic alcohols and aliphatic mercaptans.
4. An ester of chlorovinylboronic acid with an aliphatic alcohol.
5. A process of making an ester of chlorovinylboronic acid with an aliphatic alcohol which comprises reacting said aliphatic alcohol with a compound selected from the group consisting of chlorovinylboronic acid and chlorovinylboron oxide.
6. An ester of chlorovinylboronic acid with methanol.
7. An ester of chlorovinylboronic acid with ethylene glycol.
8. An ester of chlorovinylboronic acid with glycerol.

WILBUR A. LAZIER.
PAUL L. SALZBERG.